Patented May 29, 1928.

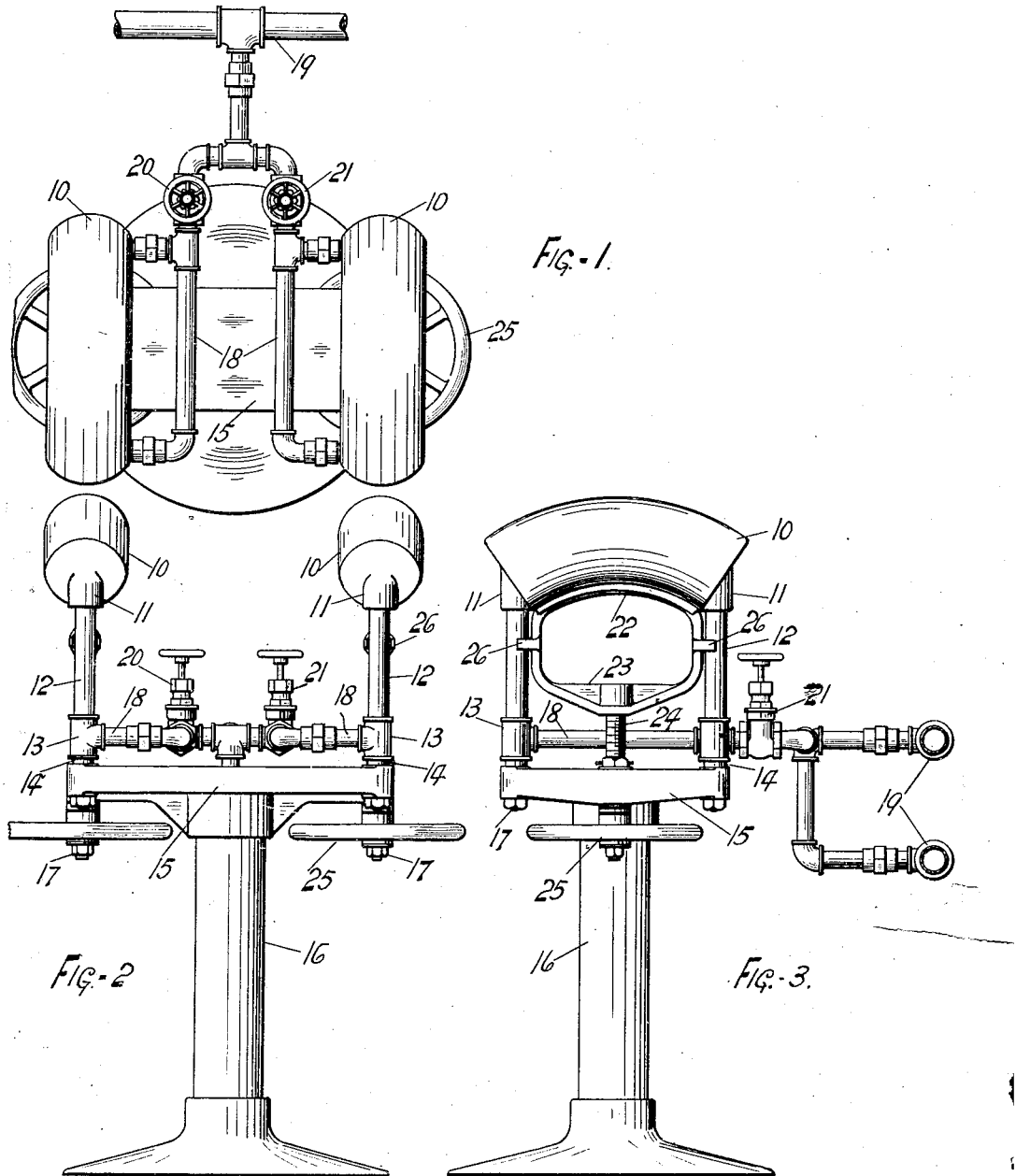

1,671,937

UNITED STATES PATENT OFFICE.

FRANK W. SCOTT, OF KENMORE, OHIO, ASSIGNOR TO THE FIRESTONE TIRE AND RUBBER COMPANY, OF AKRON, OHIO, A CORPORATION OF OHIO.

APPARATUS FOR REPAIRING TIRES.

Application filed September 24, 1926. Serial No. 137,508.

This invention relates to apparatus for repairing pneumatic tire casings.

The general purpose of the invention is to provide improved apparatus for curing tire repairs by the "internal arm" method.

One object is to provide a simple and rugged supporting means for the heating elements, the heating medium pipe system, and the muslin wrapper tightening means.

Another object is to provide a novel form of muslin wrapper tightening means whereby said wrapper may be more rapidly and evenly applied and tightened on the tire casing to be repaired. The foregoing and other objects are obtained by the apparatus disclosed in the accompanying drawings and referred to below. It is to be understood that the invention is not limited to the particular apparatus disclosed which is merely to illustrate a preferred embodiment of my invention.

Of the accompanying drawings:

Figure 1 is a plan view illustrating apparatus, embodying the invention in use for repairing tire casings;

Figure 2 is a front elevation thereof; and

Figure 3 is a side elevation thereof.

Referring more particularly to the drawings, 10 indicates a standard form of internal arm or hollow heating element having inlets 11, for introducing therein a fluid heating medium, preferably steam. Threaded to inlets 11, are steam pipes 12, which have T fittings 13 threaded to their lower ends. Solid plugs 14 are threaded into the lower end of the T fittings and extend through holes in supporting table 15 attached to the upper end of standard 16, the end of plugs 14 extending through the table being clamped to the latter by nuts 17.

All of the weight of the tire casing to be repaired (not shown) and of the heating element is thus supported by table 15 independently of the horizontal steam supply pipes 18 which are threaded to the side outlet of the T fittings and connected by suitable piping to the heads 19. The heating elements 10 are adapted to be mounted on table 15 in pairs as illustrated by the drawings, the heating of each element being separately regulated by valves 20 and 21.

An arcuate bar 22 with integral yoke portion 23 is adapted to be drawn downwardly from beneath heating element 10 by a screw 24 journalled in table 15 and operated by a hand wheel 25. The yoke portion 23 is vertically mounted and is kept in vertical alinement and prevented from relative rotation with the heating element by lugs 26 extending partly around pipes 12. Bar 22 around which a muslin tire casing wrapper (not shown) is passed can thus be drawn downwardly to tighten said wrapper about the casing, the strain on said bar being transmitted to the table 15 through screw 24 and independently of horizontal pipes 18.

By attaching screw 24 to bar 22 through a yoke portion instead of directly thereto, leaves the central portion of the bar free and greatly facilitates the wrapping of the muslin strip.

The novel manner of supporting the heating element and muslin wrapper tightening means described herein, prevents entirely the breaking off of the threaded ends of the horizontal steam pipes which breaking is continually occurring in prior apparatus where such heating element and tightening means are supported entirely by the piping system.

Modifications of the above described invention may be resorted to without departing from the spirit thereof or the scope of the appended claims.

What is claimed is:

1. Apparatus for repairing pneumatic tire casings, comprising in combination, a supporting table, hollow arms for supporting and heating a tire casing thereon, said arms being adapted to have a fluid heating medium circulated therethrough and being mounted above opposite sides of said table, means for mounting said arms above said table and for conducting a fluid heating medium thereto comprising vertical pipes attached to the ends of said arms and rigidly anchored in said table, horizontal heating medium supply pipe lines connected to said vertical pipes, a valve in each pipe line for separately regulating the heating of each of the arms and a muslin wrapper tightening means comprising an arcuate bar vertically adjustable below each hollow arm, a yoke portion integral with said bar, said yoke portion having lugs embracing said vertical pipes for alining said bar and yoke portion vertically below said hollow arm and above said table, a screw member threaded to said yoke portion and journalled in said table, a portion of said screw member extending below said table, and a hand wheel for operating said screw and mounted on the portion thereof extending below said table.

2. A tire casing repairing device comprising a table, an arm for supporting and heating a tire casing said arm being mounted above said table, vertical members anchored to said table for supporting said arm a vertically adjustable bar below said arm for tightening a wrapper to be applied about said bar and about the tire casing on the arm, a yoke attached to said bar and having lugs embracing said vertical members for alining said yoke and bar with said arm, and screw means journalled in said table for actuating said yoke and bar.

FRANK W. SCOTT.